C. H. FULLER.
Piston-Rod Packings.

No. 146,389.                    Patented Jan. 13, 1874.

WITNESSES:

INVENTOR:

BY

ATTORNEYS.

UNITED STATES PATENT OFFICE.

CHARLES H. FULLER, OF AKRON, OHIO, ASSIGNOR TO HIMSELF AND EDMUND W. DEACON, OF SAME PLACE.

IMPROVEMENT IN PISTON-ROD PACKINGS.

Specification forming part of Letters Patent No. 146,389, dated January 13, 1874; application filed November 15, 1873.

*To all whom it may concern:*

Be it known that I, CHARLES H. FULLER, of Akron, in the county of Summit and State of Ohio, have invented a new and useful Improvement in Piston-Rod Packing, of which the following is a specification:

The invention will first be fully described and then pointed out in the claim.

Figure 1:
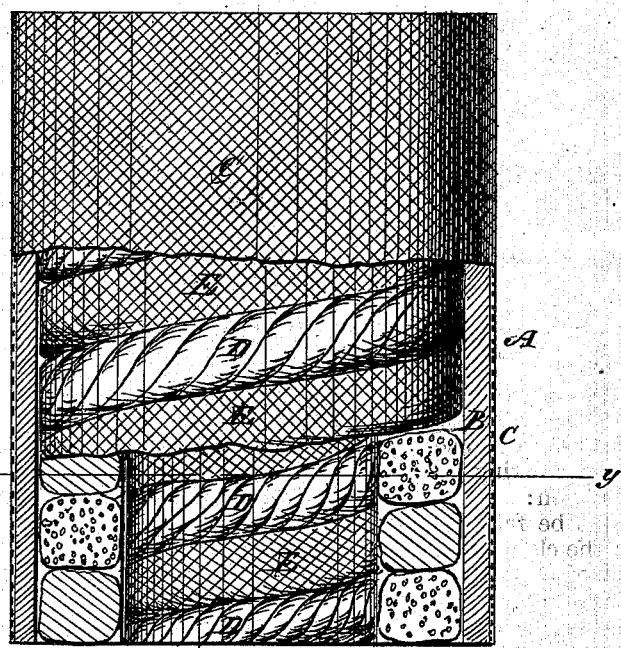
Figure 2:
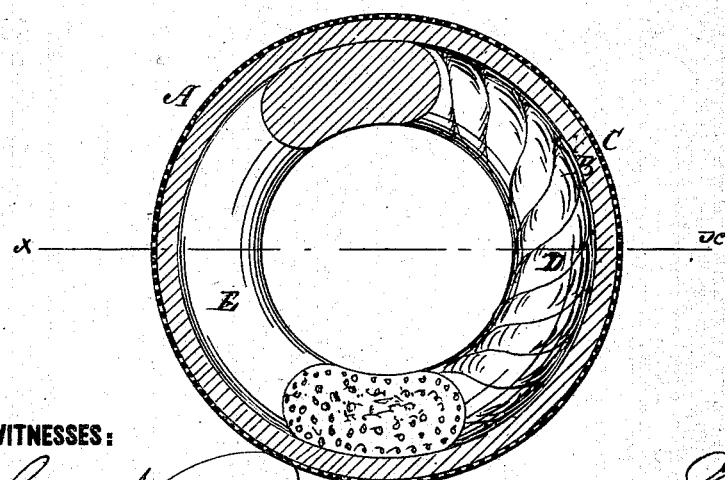

Figure 1 is a side view of a packing, partly in section, on the line $x\ x$ of Fig. 2. Fig. 2 is a cross-section taken on the line $y\ y$ of Fig. 1.

Similar letters of reference indicate corresponding parts.

A is an outside casing, composed of a tube of rubber, B, surrounded by covering of canvas or similar flexible material C. D is a coil of hempen rope, and E is a coil of rope made of rubber cloth. The hempen rope is filled with pulverized soap-stone. These ropes D and E are wound around a mandrel of wood or other material of the size of the piston-rod, alternately, and then surrounded by the casing, and the whole is cut off square, so as to fill the stuffing-box. In this manner the packing is prepared for use, and may be placed around the piston-rod by cutting it open longitudinally, either parallel or obliquely with the piston-rod.

The packing is elastic, and is made to hug the rod by screwing down the gland. The rubber casing keeps the coils in place, and the soap-stone, combined with the hemp, prevents friction.

I do not confine myself strictly to the proportions of the rubber and hempen ropes, or the arrangement of the coils, as variations may be made without departing from my invention.

Having thus described my invention, I claim as new and desire to secure by Letters Patent—

A packing, composed of coils D and E, surrounded by an outside casing, A, substantially as shown and described, for the purposes described.

C. H. FULLER.

Witnesses:
J. E. WESENER,
C. A. BROUSE.